US006495085B1

United States Patent
Simpson et al.

(10) Patent No.: US 6,495,085 B1
(45) Date of Patent: Dec. 17, 2002

(54) METHOD OF CONDITIONING FOAM MATERIALS BY COMPRESSION

(75) Inventors: Clay Simpson, Irvine, CA (US); Rick D. Lawson, Irvine, CA (US)

(73) Assignee: The Soundcoat Company, Ltd., Deer Park, NY (US)

( * ) Notice: Subject to any disclaimer, the term of this patent is extended or adjusted under 35 U.S.C. 154(b) by 0 days.

(21) Appl. No.: 09/627,464

(22) Filed: Jul. 28, 2000

(51) Int. Cl.$^7$ .............................................. B29C 67/20
(52) U.S. Cl. ..................................................... 264/321
(58) Field of Search ......................................... 264/321

(56) References Cited

U.S. PATENT DOCUMENTS

| | | | | |
|---|---|---|---|---|
| 2,071,647 A | * | 2/1937 | Miller | 264/321 |
| 2,384,387 A | * | 9/1945 | Meyer | 264/321 |
| 2,659,935 A | * | 11/1953 | Hammon | 264/321 |
| 2,899,708 A | * | 8/1959 | Donaldson et al. | 264/321 |
| 3,101,242 A | * | 8/1963 | Jackson, Jr. | 264/321 |
| 3,125,621 A | * | 3/1964 | Coppick | 264/321 |
| 3,246,443 A | * | 4/1966 | Slemmons | 264/321 |
| 3,394,214 A | * | 7/1968 | Benning | 264/321 |
| 3,445,406 A | * | 5/1969 | Koch | 264/321 |
| 3,867,221 A | * | 2/1975 | Chant | 156/77 |
| 4,265,851 A | * | 5/1981 | Roth | 264/321 |
| 4,299,883 A | * | 11/1981 | Roth et al. | 264/321 |
| 4,334,944 A | * | 6/1982 | Creyf | 156/308.2 |
| 4,524,037 A | * | 6/1985 | Marc | 264/321 |
| 4,636,343 A | * | 1/1987 | Long et al. | 264/321 |
| 5,505,886 A | * | 4/1996 | Baugh et al. | 264/321 |
| 5,629,076 A | * | 5/1997 | Fukasawa et al. | 264/235.8 |

FOREIGN PATENT DOCUMENTS

| | | | | |
|---|---|---|---|---|
| JP | 43-26100 | * | 11/1968 | 264/321 |
| JP | 5-220757 | * | 8/1993 | 264/321 |

* cited by examiner

*Primary Examiner*—Allan R. Kuhns
(74) *Attorney, Agent, or Firm*—Cohen, Pontani, Lieberman & Pavane

(57) ABSTRACT

The inventive method comprises compressing roughly half a bun of polyimide foam at a rate of no more than 12 feet per minute from its initial height of approximately 15", until it reaches a compressed height of no more than 2". The compression is maintained on the bun for no more than one minute, and then released. The half-bun is then permitted to expand, and it will rebound to approximately 90–95% of its initial height. This conditioned foam may then be cut or otherwise formed into acoustical panels of varying heights and/or configurations, without worry about the ultimate shrinkage after treatment. In addition the treated half-bun may be cut into irregular shapes of more varying dimensions, up to the maximum dimension of the treated half-bun.

8 Claims, 1 Drawing Sheet

METHOD OF CONDITIONING FOAM MATERIALS BY COMPRESSION

BACKGROUND OF THE INVENTION

1. Field of the Invention

This invention relates to the field of manufacturing sound-absorbent materials, and, more particularly, to a method for treating polyimide foam by compression.

2. Description of the Related Art

In co-pending U.S. patent application Ser. No. 09/296,632, filed Apr. 22, 1999, a panel for absorbing acoustic energy is described. The disclosure of that application in hereby incorporated by reference.

In the referenced application, a sound absorbing panel of foamed polyimide is described, together with the utility and industrial applicability thereof. The method described therein of manufacturing the sound absorbent panels, describes the known method of manufacturing single panels. This is a time consuming and laborious operation, resulting in panels of higher cost than would be preferred, since the panels are manufactured individually.

In the previously disclosed method, a bun of polyimide foam is prepared in traditional fashion. This bun has standard dimensions of approximately 50" wide×100" long and approximately 30" high. According to the known method of manufacture, this bun is permitted to cure in a container having an open top, so that the cured bun has a rounded top, much like a loaf of bread. According to the known method of manufacturing panels, this bun is then cut into panels having the desired cross section. Each such panel is then conditioned individually. This conditioning consists of compressing a 3" sheet of material from about 50% to about 75% of its uncompressed height, and thereby produce a densified foam that has an increased density of approximately 7–20%. A panel so conditioned provides increased acoustic absorption.

This method of manufacture has some drawbacks. First, it is time consuming to condition each sheet individually, and it would be advantageous to condition larger quantities of foam.

In addition, since the conditioning process occurs after the foam is cut into its desired shape, it may not have the precise dimensions desired for its ultimate goal, since it will be slightly compressed from its original shape. While it is possible under this prior method to approximate the resultant compressed dimensions, it would be preferable to have more precisely configured sheets utilized in the ultimate application.

Finally, it would be preferred if larger quantities of foam could be conditioned so that larger and differently shaped panels could be produced, which is not possible when foam is processed in smaller quantities.

Accordingly, there is a need in the art for a method for processing and conditioning larger quantities of polyimide foam for use in acoustic absorption.

SUMMARY OF THE INVENTION

In accordance with the invention, there is provided a new method of treating foam in a bun.

In a preferred embodiment of the invention, the method comprises compressing roughly half a bun of polyimide foam at a rate of no more than 12 feet per minute from its initial height of approximately 15", until it reaches a compressed height of no more than 2". The compression is maintained on the half-bun for no more than one minute, and then released. The bun is then permitted to expand, and it will rebound to approximately 90–95% of its initial height. This conditioned foam may then be cut or otherwise formed into acoustical panels of varying heights and/or configurations, without worry about the ultimate shrinkage after treatment. In addition the treated half-bun may be cut into irregular shapes of more varying dimensions, up to the maximum dimension of the treated half-bun.

In a preferred embodiment of the invention, the compression of the treated half-bun will take place at a speed of approximately 5 feet per minute.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
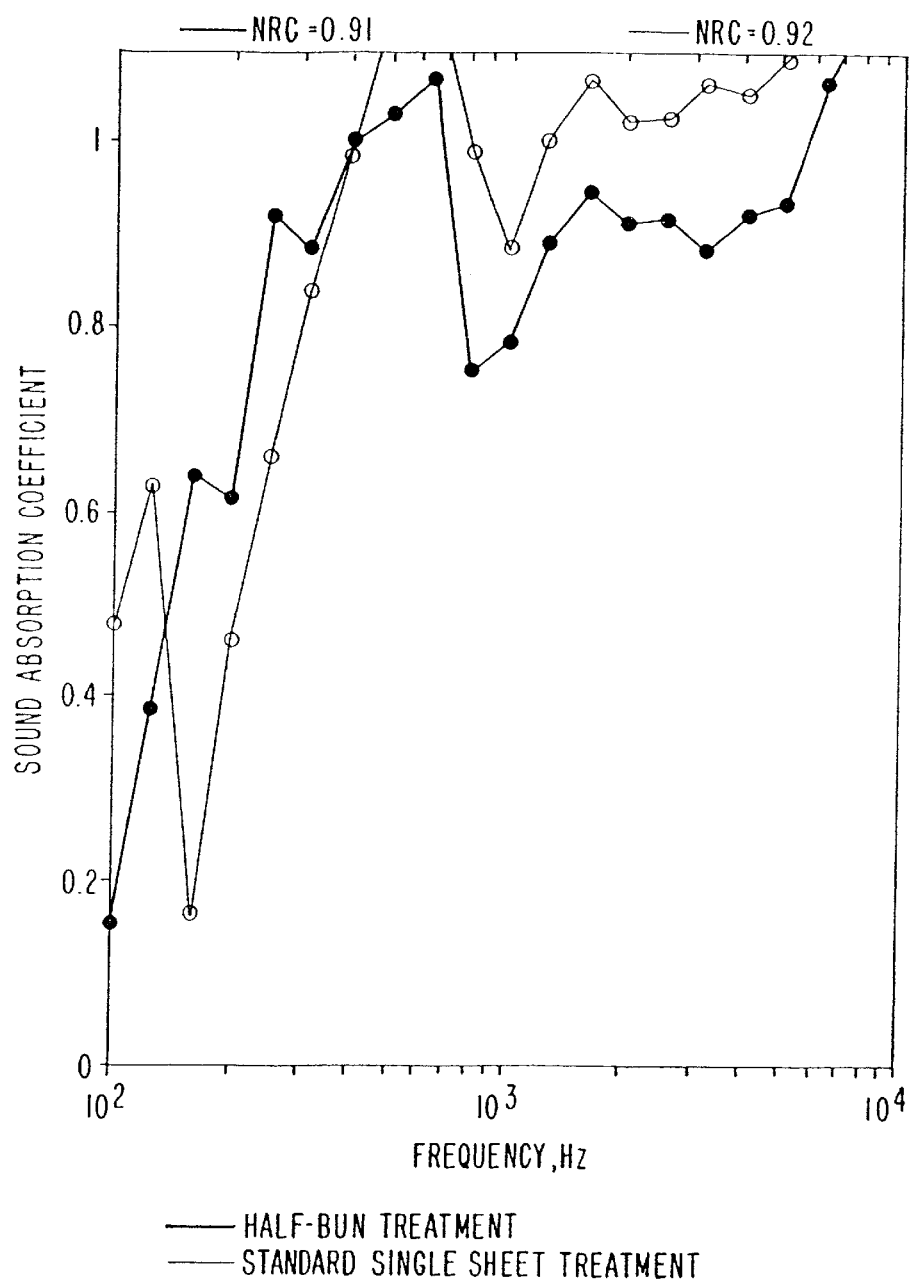
FIG. 1 is a chart showing the relative acoustical properties of a sheet of compressed polyimide foam, manufactured individually vs. the acoustic properties of a similarly shaped polyimide foam sheet manufactured in accordance with the invention.

The method of manufacturing polyimide foam is well-known, and will not be described here in detail. It is sufficient to state that, in the ordinary course of manufacture, production quantities of foamed material generally result in a "bun" of material. A standard bun of polyimide foam is approximately 50" wide, 100" long and 30" tall. The material is generally produced in an opened topped box, and permitted to cure therein. The open top allows the top of the bun to expand, and results in a bun having a generally curved top, similar to a loaf of bread.

As disclosed in the referenced patent application, it has been learned that compressing individual sheets of polyimide foam results in sheets of materials having improved acoustical absorption, but treating individual sheets is inefficient.

We have learned that it is possible to treat a half-bun of polyimide foam by controlling the rate of compression of the foam so that it does not break.

It is believed that treating approximately 15" thick pieces of foam is optimal, because compressing too large a piece would risk irregularities on the internal ordering of the foamed particles. Treating roughly half of the bun (in height) avoids this risk, while conveying the benefits of the inventive method. Additionally, this results in two roughly equal treated portions of foam.

In accordance with the invention, it is possible to compress a half-bun of polyimide foam. To do so, a half-bun (a full bun being cut in two roughly equal portions along a plane parallel to the bottom thereof) of foam is placed in a hydraulic press capable of compressing the foam. The pressure should be applied evenly over the top of the half-bun, and, to this end, it is therefore preferred that two hydraulic pistons apply pressure evenly to the top surface of the half-bun. A half-bun of foam is slid into the press through a side opening. The press should have walls spaced from the sides of the foam so that the foam will not scrape the side of the walls during compression or get pinched between the moving top of the press and its stationary side walls. The press should apply sufficient force to compress the bun at a rate not in excess of 12 feet per minute. A total of approximately 20–30 tons, and preferably 25 tons, applied to the top of the half-bun is sufficient. Thus the force applied to the top should be in the range of 8–12 psi, and preferable about 10 psi.

In the most preferred embodiment, the optimum speed is about 5 feet per minute. The 15" high half-bun is then pressed until it reaches a height of approximately 2", where it is maintained for no more than one minute. At that point the pressure is released, and the compressed half-bun is permitted to expand ("rebound") for a period of at least 48 hours, and preferably 72 hours, when it will rebound to a height of approximately 13 or 14" from its initial height of 15". Shorter periods will result in insufficient expansion and should be avoided.

Once the bun has fully rebounded, the half-bun is in condition for use and may be formed into any desired shape. Depending on the application, this may be any irregular shape, or, in most embodiments, simple generally flat sheets having desired dimensions.

After testing, it has been determined that sheets cut from a half-bun undergoing this treatment display acoustical absorptive properties similar to those of individually formed sheets. FIG. 1 illustrates a comparison of the two.

FIG. 1 shows a comparison of the Noise Reduction Coefficient (NRC) of a sheet of material manufactured by means of the inventive method (shown in dark line) against the NRC of a sheet of material manufactured as a single sheet (shown in fine line), over a range of frequencies. The two results are comparable and exceed required performance minima.

Half-buns treated in this fashion, display the additional benefit of being able to be utilized in many more applications, because the treated foam is not limited in size or shape to that of single sheets as previously known.

It will be appreciated by those of ordinary skill in the art that the inventive method could be used with other foamed materials as well, such as melamine or polyurethane.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A method of treating a piece of cured foamed material, said piece having a top, bottom and sides, and a height measured between said top and said bottom thereof, said method comprising:

compressing said piece at a rate of no more than twelve feet per minute;

stopping said compressing when said piece is compressed to no more than 15% of said height;

maintaining pressure on said piece for a period of no more than one minute after compression of said piece stops;

releasing said pressure on said piece; and permitting said piece to rebound for a period of no less than 48 hours, whereby the acoustical absorption provided by said piece is increased.

2. The method of claim 1, wherein said compressing is performed at a rate of no more than approximately five feet per minute.

3. The method of claim 1, wherein said period is at least 72 hours.

4. The method of claim 1, wherein said pressure applied to said piece is in the range of 8 to 12 psi.

5. The method of claim 1, wherein said compressing is imparted to said top of said piece.

6. The method of claim 5, wherein said compressing is imparted substantially evenly along said top of said piece.

7. The method of claim 1, wherein said piece is compressed to no more than 10% of said height.

8. The method of claim 1, wherein the foamed material is a polyimide.

* * * * *